United States Patent
Yukawa

(10) Patent No.: US 7,975,740 B2
(45) Date of Patent: *Jul. 12, 2011

(54) PNEUMATIC TIRE AND RIM ASSEMBLY WITH NOISE DAMPER AND PNEUMATIC TIRE WITH NOISE DAMPER

(75) Inventor: Naoki Yukawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 940 days.

This patent is subject to a terminal disclaimer.

(21) Appl. No.: 11/887,904

(22) PCT Filed: Mar. 23, 2006

(86) PCT No.: PCT/JP2006/305841
§ 371 (c)(1),
(2), (4) Date: Oct. 4, 2007

(87) PCT Pub. No.: WO2006/117944
PCT Pub. Date: Nov. 9, 2006

(65) Prior Publication Data
US 2009/0038726 A1 Feb. 12, 2009

(30) Foreign Application Priority Data
Apr. 28, 2005 (JP) ................... 2005-132428

(51) Int. Cl.
*B60C 5/00* (2006.01)
*B60C 19/00* (2006.01)
(52) U.S. Cl. ................. 152/450; 152/375; 152/381.6
(58) Field of Classification Search ........... 152/450, 152/375, 381.6
See application file for complete search history.

(56) References Cited

U.S. PATENT DOCUMENTS
6,726,289 B2 * 4/2004 Yukawa et al.
(Continued)

FOREIGN PATENT DOCUMENTS
JP 1-78902 A 3/1989
(Continued)

OTHER PUBLICATIONS

Engineering Materials Properties and Selection, 2nd ed., Kenneth G. Budinski, Reston Publishing Company, Inc., Reston, VA, 1983, p. 75.*

(Continued)

*Primary Examiner* — Adrienne C Johnstone
(74) *Attorney, Agent, or Firm* — Birch, Stewart, Kolasch & Birch, LLP

(57) ABSTRACT

To reduce road noise in running by disposing a noise damper made of a spongy material in a cavity of a tire, a tire and rim assembly is provided. The tire and rim assembly 1 including a rim 2, a pneumatic tire 3 attached to the rim 2, and a noise damper 4 made of a spongy material which is disposed in a tire cavity "i" surrounded by the rim 2 and the pneumatic tire 3 and extends in the tire circumferential direction, wherein the noise damper 4 has a volume of 0.4 to 20% of the whole volume of the tire cavity "i" and is fixed to an inner surface 2i or 3i of the tire or rim, the noise damper 4 has a height of 30 mm or less from the inner surface, and the spongy material of the noise damper 4 has a hardness of 10 to 250 N, a tensile strength of 70 kPa or more and a specific gravity of 0.014 to 0.052.

13 Claims, 12 Drawing Sheets

U.S. PATENT DOCUMENTS

| | | | |
|---|---|---|---|
| 7,182,114 B2 * | 2/2007 | Yukawa | 152/450 |
| 2003/0188817 A1 | 10/2003 | Yukawa et al. | |
| 2005/0098251 A1 | 5/2005 | Yukawa | |
| 2005/0155686 A1 | 7/2005 | Yukawa et al. | |
| 2005/0275277 A1 | 12/2005 | Yukawa | |

FOREIGN PATENT DOCUMENTS

| | | | |
|---|---|---|---|
| JP | 04334603 A | * | 11/1992 |
| JP | 2003-63208 A | | 3/2003 |
| JP | 2005-138760 A | | 6/2005 |
| JP | 2005-350027 A | | 12/2005 |
| WO | WO 03/103989 A1 | | 12/2003 |

OTHER PUBLICATIONS

The Principles of Engineering Materials, Craig R. Barrett et al., Prentice-Hall, Inc, Englewood Cliffs, NJ, 1973, pp. 218-219.*

* cited by examiner (Unit : mm)

000000# PNEUMATIC TIRE AND RIM ASSEMBLY WITH NOISE DAMPER AND PNEUMATIC TIRE WITH NOISE DAMPER

BACKGROUND OF THE INVENTION

1. Technical Field

The present invention relates to an assembly of a pneumatic tire and a rim, in which a noise damper made of a spongy material is disposed in a tire cavity to reduce a road noise generated during running.

2. Background Art

As one of tire noises is known a so-called road noise which sounds like "GHO" within a frequency range of 50 to 400 Hz when running on a road. A main cause of the road noise is considered a resonance vibration of air (cavity resonance) which generates in the tire cavity.

In order to reduce such a road noise, it is proposed to dispose, as shown in FIG. 13(A), a noise damper "a" which is made of a spongy material and extends circumferentially, in a tire cavity "i" surrounded by a tire "b" and a rim "c", thereby absorbing a resonance energy generated in the tire cavity "i" (cf. Patent Literature 1). In order to prevent the noise damper "a" from frequently colliding with the inner surface of the tire by centrifugal force and lateral force during running, the noise damper "a" is adhered for example to the inner surface of the tire "b".

However, as a result of making a durability test on a tire assembly having the noise damper "a" by using a drum durability tester in further investigation of the present inventor, it was found that if the height H of the noise damper "a" is large, swaying or the like is easy to occur at the time of high speed running and, consequently, peeling may occur.

It was also found that, as shown in FIG. 13 (B) in an enlarged form, cracking "g" is easy to occur in the vicinity of the adhesion surface "f" at circumferential both ends "e" of the noise damper "a". Unlike adhesive peel, cracking "g" is cracking of a spongy material itself and, therefore, it is supposed that cracking also occurs when the adhesive strength to the tire "b" is increased.

Patent Literature 1: JP-A-2003-63208

SUMMARY OF THE INVENTION

Problem to be Solved by the Invention

The present invention has been made in view of the problems mentioned above. An object of the present invention is to provide a pneumatic tire-rim assembly capable of reducing a road noise over a long term, while preventing peeling and damages of a noise damper, on the basis of definitely specifying the height of the noise damper, the hardness, tensile strength and specific gravity of a spongy material used for the noise damper, the shape of circumferential both ends of the noise damper, and the like.

Means to Solve the Invention

An assembly of a pneumatic tire and a rim according to the present invention includes a rim, a pneumatic tire attached to the rim and a noise damper made of a spongy material which is disposed in a tire cavity surrounded by the rim and the pneumatic tire and extends in the circumferential direction of the tire, and is characterized in that the noise damper has a volume V2 of 0.4 to 20% of the whole volume V1 of the tire cavity and a height of 30 mm or less from the cavity-facing surface, is fixed to a cavity-facing surface located on the tire side or rim side and has, at its circumferential both ends, tapered portions that the height is gradually decreased, and the spongy material of the noise damper has a hardness of 10 to 250 N, a tensile strength of 70 kPa or more and a specific gravity of 0.014 to 0.052.

A pneumatic tire device according to the present invention includes a pneumatic tire including a tread portion, a pair of sidewall portions radially inwardly extending from both edges of the tread portion, and bead portions disposed at radially inner edges of the sidewall portions; and a noise damper made of a spongy material which is fixed to the inner surface of the pneumatic tire at the tread region and extends in the circumferential direction of the tire, and the device is characterized in that the noise damper has a height of 30 mm or less from the inner surface, a hardness of 10 to 250 N, a tensile strength of 70 kPa or more and a specific gravity of 0.014 to 0.052.

In the specification, the hardness of the spongy material denotes a value measured according to a method A (paragraph 6.3) among methods for measuring hardness in paragraph 6 prescribed in JIS K6400 "Testing Methods for Flexible Urethane Foam".

Further, the tensile strength of the spongy material denotes a value measured for No. 1 dumbbell specimens according to "tensile strength and elongation" prescribed in paragraph 10 of JIS K6400.

The specific gravity of the spongy material denotes a value obtained by converting an apparent density measured according to "apparent density" prescribed in paragraph 5 of JIS K6400 into specific gravity.

Further, in the specification, the "volume V2" of the noise damper is an apparent whole volume of the noise damper, and denotes a volume defined by the outward form of the noise damper and including cells inside the noise damper. The "whole volume V1 of the tire cavity" is approximately obtained according to the following equation with respect to an assembly in the normal state that a normal internal pressure and no load are applied to the assembly:

$$V1 = A \times \{(Di-Dr)/2 + Dr\} \times \pi$$

wherein "A" is the cross sectional area of the cavity obtained by CT scanning of the cavity of the tire in the normal state, "Di" is the maximum outer diameter of the cavity of the tire in the normal state as shown in FIG. 1, "Dr" is the diameter of the rim, and "π" is the ratio of the circumference of a circle to its diameter.

The "normal internal pressure" mentioned above means an air pressure defined for every tire in a standardizing system on which the tire is based and, for example, denotes the maximum air pressure in JATMA, the maximum value recited in the table of "Tire Load Limits at Various Cold Inflation Pressures" in TRA, and the "Inflation Pressure" in ETRTO, provided that in case of tires for passenger cars, the "normal internal pressure" is defined as 200 kPa in consideration of actual frequency of use

EFFECTS OF THE INVENTION

The pneumatic tire-rim assembly of the present invention has the advantage that peeling of a noise damper is prevented and damages such as cracking liable to occur at circumferential both end portions of the noise damper is suppressed, so the durability of the noise damper can be drastically improved

DETAILED DESCRIPTION OF THE PREFERRED EMBODIMENTS

An embodiment of the present invention will now be explained with reference to the accompanying drawings.

FIG. 1 is a meridian section view illustrating a pneumatic tire-rim assembly 1 of this embodiment including a tire rotation shaft, FIG. 2 is a cross sectional view taken on line A-A in FIG. 1, and FIG. 3 is an enlarged cross sectional view of the tire.

The assembly 1 includes a rim 2, a pneumatic tire 3 attached to the rim 2, and a noise damper 4 which is disposed in a tire cavity "i" surrounded by the rim 2 and the tire 3 and extends in the circumferential direction of the tire.

In this embodiment, as the rim 2 is illustrated a so-called two piece wheel rim made of a metal comprising a rim body 2a on which bead portions 3b of the tire 3 are mounted, and a disk 2b supporting the rim body 2a and fixed to an axle. Of course, one piece rim and others can also be used. In this embodiment, normal rims prescribed in the standards mentioned above such as JATMA and the like are used.

The pneumatic tire 3 is, for example, a tubeless tire for passenger cars which include, as shown in FIGS. 1 and 3, a tread portion 3t, a pair of sidewall portions 3s, 3s radially inwardly extending from both edges of the tread portion 3t, and a pair of bead portions 3b, 3b disposed at radially inner edges of the sidewall portions. Thus, cavity-facing surface 3i of the tire is covered with an inner liner rubber having a low air permeability.

The tire 3 is reinforced at least by a carcass 6 having a radial structure and a belt layer 7 disposed inside the tread portion 3t and radially outward of the carcass.

The carcass 6 comprises one carcass ply 6A using for example an organic fiber cord or a plurality of carcass plies 6A (in this embodiment, one carcass ply), and both end portions thereof are turned up around bead cores 8. The belt layer 7 in this embodiment comprises two inner and outer belt plies 7A, 7B which are radially stacked one after another. The respective belt plies 7A, 7B are disposed so that steel cords are oriented at an angle of about 10 to about 30° with respect to the tire equator C and the steel cords in one belt ply cross the steel cords in the other belt ply. The radially inner belt ply 7A has a width larger than the radially outer belt ply 7B.

The noise damper 4 is made of a spongy material. The spongy material is a sponge-like porous material and encompasses, besides so-called sponges having open cells obtained by expanding rubbers or synthetic resins, web-like materials in which an animal fiber, a vegetable fiber, a synthetic fiber or the like are intertwined to form an integral body. The term "porous material" encompasses not only those having open cells but also those having closed cells. In this embodiment, an open cell type sponge material made of a polyurethane is used as the noise damper 4.

The spongy materials as mentioned above lower the volume of sound (cavity resonance energy) to reduce a road noise, since a porous portion in the surface of or inside the material converts a vibration energy of vibrating air into heat energy to consume it. Since the spongy material easily undergoes deformation such as shrinking or bending, it does not exert a substantial influence on deformation of a tire at the time of running. Therefore, the spongy material will not deteriorate the steering stability. Moreover, since the spongy material has a very small specific gravity as compared with a solid rubber, the spongy material will not deteriorate the weight balance of the tire.

Preferable examples of the spongy material are a sponge of a synthetic resin such as an ether-based polyurethane sponge, an ester-based polyurethane sponge or a polyethylene sponge, a sponge of a rubber such as a chloroprene rubber sponge (CR sponge), an ethylene-propylene rubber sponge (EPDM sponge) or a nitrile rubber sponge (NBR sponge), and the like. Polyurethane sponges including ether-based polyurethane sponge, and polyethylene sponges are particularly preferred from the viewpoints of noise reduction property, light weight, controllability of foaming and durability.

When the assembly 1 is charged with a high pressure air by using a compressor, moisture included in the air may enter into the tire cavity "i". In this respect, too, an ether-based polyurethane sponge which is resistant to hydrolysis is preferred as the spongy material. Also, in order to prevent water from soaking into the spongy material when it gets wet, it is preferable to provide the spongy material with a water repellency. Further, in order to prevent generation of mold owing to moisture, it is also preferable to provide the spongy material with an antifungal property. Further, in order to lower toxicity of waste gases generated when waste tires are incinerated, it is particularly preferable to form a spongy material from a material containing no halogen atom.

The noise damper 4 has a volume V2 of 0.4 to 20% of the whole volume V1 of the tire cavity. In FIG. 4 are shown results of experiments wherein a noise damper 4 was disposed in the tire cavity "i" and a road noise was measured. The axis of ordinates shows a road noise reduction amount, and the axis of abscissas shows a volume ratio V2/V1. The road noise reduction amount denotes that compared with an assembly which is not provided with the noise damper 4 in the tire cavity "i".

As apparent from FIG. 4, a road noise reduction effect of about 2 dB or more can be expected by securing at least 0.4% of the volume V2 of the noise damper 4 based on the whole volume V1 of the tire cavity "i". This noise reduction level can be clearly recognized in a car room. It is particularly preferable that the volume V2 of the noise damper 4 is at least 1%, especially at least 2%, more especially at least 4%, of the whole volume V1 of the tire cavity "i". On the other hand, even if the volume V2 of the noise damper 4 exceeds 20% of the whole volume V1 of the tire cavity "i", the noise reduction effect will not increase, but rather the cost increases and the weight balance of assembly 1 is deteriorated. From such points of view, it is preferable that the volume V2 of the noise damper 4 is at most 10% of the whole volume V1 of the tire cavity "i". These experimental results are those obtained by using a single noise damper 4, but it has been confirmed that even if two ribbons of noise dampers 4 are disposed, similar effects are exhibited so long as the total volume of the noise dampers falls within the above range.

The noise damper 4 has an adhesion face 4A fixed to the inner surface 3i of the tire or the inner surface 2i of the rim, and a free face 4B which is located on the opposite side to the adhesion face 4A and faces the tire cavity "i", whereby the noise damper 4 does not move freely within the tire cavity "i" even during running. The inner surface 3i of the tire is the surface of the tire 3 which faces the tire cavity "i", and the inner surface 2i of the rim is the surface of the rim 2 which faces the tire cavity "i". There is a possibility that bead portions 3b are pressed hard against the inner surface 2i of the rim when tires are replaced. Therefore, preferably, the noise damper 4 is fixed to the inner surface 3i of the tire. In order to secure a sufficient area of adhesion to the inner surface 2i or 3i, the adhesion face 4A of the noise damper 4 in this embodiment is formed of a substantially flat surface.

Further, the noise damper 4 is fixed to a tread region 3ti of the inner surface 3i of the tire. The tread region 3ti is a region which is reinforced by a belt layer 7. A centrifugal force generated at the time of high speed running acts radially outwardly. Therefore, when the noise damper 4 is fixed to the tread region 3ti, the noise damper 4 is effectively pressed against the tire 3 by the centrifugal force to restrict the movement of the damper 4. In particular, it is preferable to dispose the noise damper 4 so that the center of the axial width SW of the adhesion face 4A of the noise damper 4 is located substantially on the tire equator C.

The cross sectional shape of the noise damper 4 is not particularly limited, but various shapes are adoptable, e.g., rectangular shape, trapezoidal shape, triangular shape, warhead shape, semi-circular shape and the like. The shape is suitably determined from the viewpoints of productivity, durability, road noise reduction effect and so on of the noise damper 4. It is particularly preferable that the cross sectional shape of the noise damper 4 is symmetrical with respect to the center line of the width SW of the damper 4, as in the present embodiment. In case that the cross sectional shape of the noise damper is asymmetrical, its lateral rigidities are different on the left and right sides and the noise damper 4 is prone to incline toward a side having a smaller rigidity.

erably at most 20 mm. The height H is measured in the direction perpendicular to the adhesion face 4A with respect to a noise damper 4 fixed to a tire 3 in the state (under ordinary temperature and ordinary pressure) prior to mounting the tire 3 on a rim.

The present inventor made a test with respect to noise dampers 4 having varied heights H in which after high speed running, it was observed whether the noise damper fell sideways or not and whether cracking damage occurred or not. The noise dampers were prepared from sponges "E16" and "NE28" (details of which are shown in the Examples described after) made by Marusuzu Co., Ltd. Each noise damper had a rectangular cross section having a size shown in Table 1, and was a long rectangular piece having a length of 1,850 mm and non-tapered both ends. It was curved along the tread region of the inner surface 3i of a tire and fixed thereto with a pressure sensitive adhesive double coated tape. The high speed running test was made by a speed step-up test according to ECE 30. The presence of cracking damage was determined according to a durability test described after.

TABLE 1

| | (Size of tire tested: 195/65R15) | | | | | | | | |
|---|---|---|---|---|---|---|---|---|---|
| | Test Ex. 1 | Test Ex. 2 | Test Ex. 3 | Test Ex. 4 | Test Ex. 5 | Test Ex. 6 | Test Ex. 7 | Test Ex. 8 | Test Ex. 9 |
| Spongy material (item) | | | E16 | | | | NE28 | | |
| Sectional shape (rectangle) | | | | | | | | | |
| Width SW (mm) | 40 | 40 | 40 | 30 | 20 | 40 | 40 | 40 | 30 |
| Height H (mm) | 50 | 40 | 35 | 30 | 30 | 50 | 40 | 30 | 20 |
| Sideways falling of noise damper after high speed durability test | X | X | X | ○ | Δ | X | X | ○ | ○ |
| Speed and time up to destroy of tire (km/h-minute) | 230-3 | 230-12 | 230-13 | 230-20 | 240-2 | 230-4 | 230-7 | 230-15 | 240-4 |
| Cracking | | | | | | | | | |
| After 6,000 km running | X | X | X | ○ | ○ | X | X | ○ | ○ |
| After 12,000 km running | X | X | X | X | Δ | X | X | X | Δ |

○: There is no sideways falling or no cracking.
X: Apparent sideways falling or cracking is observed.
Δ: Slight sideways falling or cracking is observed.

The noise damper 4 in this embodiment has a single groove 4G which continuously extends in the tire circumferential direction, on the free face 4B side at approximately a center portion of the axial width SW. As compared with a noise damper having a simple rectangular cross section, such a groove 4G is useful for absorbing a resonance energy in a larger amount by increase in the surface area of the noise damper. Further, since the noise damper 4 is disposed in the tread region 3ti, it receives a periodical strain and generates a heat as a result of repetition of ground contacting and ground non-contacting of the tread portion 3t, but the increase in the surface area is also useful for enhancing the heat releasing property of the noise damper 4, thus preventing thermal deterioration of the damper itself.

In order to further increase the above effects, it is preferable that the depth D of the groove 4G is at least 20%, especially at least 30%, of the height H of the noise damper 4, and is at most 95%, especially at most 90%, of the height H. Further, it is preferable that the maximum width GW of the groove 4G is at least 15%, especially at least 25%, of the width SW of the noise damper 4, and is at most 70%, especially at most 45%, of the width SW.

The height H of the noise damper 4 from the adhesion face 4A is at most 30 mm, preferably at most 25 mm, more pref- As a result of experiments, it has been found that if the height of the noise damper 4 becomes large, sideways falling of the noise damper in high speed running and cracking are easy to occur, and that for effectively suppressing the sideways falling or peeling of the noise damper 4, it is desirable that the height H of the noise damper 4 is 30 mm or less (see Test Examples 4, 5, 8 and 9).

If the height H of the noise damper 4 is too small, the effect of absorbing resonance energy tends to lower. From such a point of view, it is preferable that the height H of the noise damper 4 is at least 10mm, especially at least 15 mm. In the case that the height H of the noise damper 4 is not constant, it is required that the maximum height H falls within the above range.

As understood from Table 1, too, it is desirable that the noise damper 4 has an axial width SW which is the same as or larger than the height H, whereby the stability of the noise damper 4 can be enhanced and the noise damper 4 can be surely prevented from falling sideways at the time of high speed running. In particular, it is desirable that the width SW of the noise damper 4 is larger than its height H. More preferably, the ratio H/SW of the height H to the width SW is at most 0.7, especially at most 0.6, more especially at most 0.4, the most especially at most 0.3, and as to the lower limit, it is preferably at least 0.10.

As shown in FIG. 5, when the tire 3 is mounted on the rim 2, a tire lever 12 is inserted into the tire cavity "i". If the width SW of the noise damper 4 is too large, the noise damper 4 is apt to interfere with the tire lever 12 to cause peeling or damages, since a tip portion of the lever 12 is swayed in the X and Y directions in the vicinity of the tread region 3ti of the inner surface 3i of the tire. Further, workability of adhering the noise damper to the inner surface 3i is lowered. From such points of view, it is preferable that the width SW of the noise damper is at most 80%, especially at most 70%, more especially at most 65%, of the width BW of the belt layer 7.

In order to prevent interference between the noise damper 4 and the tire lever 12, it is desirable that the noise damper 4 has shoulder portions 11 having a height decreasing axially outwardly, at both edge portions in the width direction (corresponding to the tire axial direction) in the cross section of the noise damper 4. The shoulder portions 11 in this embodiment each is composed of a slant portion 11a at which the height of the noise damper 4 smoothly decreases outwardly in the width direction, and a low height portion 11b which is continuous with the edge of the slant portion and extends to the outer edge in the width direction to terminate there with keeping an approximately constant height. The "approximately constant height" means that a difference between the maximum height and the minimum height in the low height portion 11b is 7 mm or less. The low height portion 11b is effective for stabilizing the fixing of the noise damper.

The noise damper 4 in this embodiment can be prepared, for example, as shown in FIG. 6, by slicing a sponge base material P having a constant thickness "t" along a cut line C1 in the form of a trapezoidal wave with a constant period and dividing the sliced pieces in a constant width pitch at cut lines C2 and C3, whereby many noise dampers can be efficiently obtained and accordingly in a good productivity and an improved yield of the material. Of course, the shape of the shoulder portion 11 of the noise damper 4 can be variously changed without being limited to exemplified one.

As shown in FIGS. 2, 7 and 8, the both ends 4e, 4e in the tire circumferential direction of the noise damper 4 is tapered to give tapered portions 10 at which the height H gradually decreases toward the circumferential end 4e. The tapered portions 10 are formed so that an angle θ sandwiched between the adhesion face 4A and the free face 4B is an acute angle. Such tapered portions 10 can relatively decrease the mass of the circumferential both end portions 4e of the noise damper 4 as compared with other portions thereof. The reason cracking "g" as shown in FIG. 13(B) generates at the circumferential both ends 4e of the noise damper 4 is considered to be that a stress acting on the noise damper 4 during running concentrates locally on an adhesion face "f" of the circumferential both end portions. Therefore, the cracking "g" can be effectively controlled by providing the tapered portions 10 at the both ends 4e of the noise damper 4 to decrease the mass thereof.

In order to enhance such an effect, it is preferable that the angle θ of the tapered portions 10 of the noise damper 4 is from 15 to 70°. If the angle θ is less than 15°, there is a tendency that the road noise reduction effect is not sufficiently obtained at the tapered portions 10 since the amount of a spongy material forming the tapered portions becomes small. If the angle θ is more than 70°, sufficient weight reduction is not achieved at the circumferential both ends of the noise damper 4, so there is a tendency that sufficient effect of suppressing cracking "g" is not obtained.

From the viewpoint of the productivity, it is preferable that the tapered portion 10 on the free face 4B side is formed into a flat slanting face inclined at the above-mentioned angle θ with respect to the adhesion face 4A. As shown in side views of FIGS. 9(A) and 9(B), the free face 4B may be formed into a convexly or concavely curved surface 14 in the form of an arc surface or a spherical surface. In that case, it is preferable that an angle θ1 formed between the adhesion face 4A and a straight line X connecting the upper and lower ends of the curved surface 14 to each other is set within the above-mentioned range. Further, the maximum separation distance "h" from the straight line X of the curved surface 14 is preferably 10 mm or less.

The spongy material of the noise damper 4 has a hardness of 10 to 250 N, a tensile strength of 70 kPa or more and a specific gravity of 0.014 to 0.052.

An appropriate elongation required for the spongy material of the noise damper 4 can be secured by limiting the hardness of the spongy material. Such an elongation can disperse a stress widely, when a strain acts on the noise damper 4, and accordingly can prevent the stress from concentrating on the adhesion face "f" to be adhered to the inner surface 3i. It is particularly preferable that the hardness of the spongy material is at least 20 N, especially at least 50 N, more especially at least 80 N, and as to the upper limit, it is at most 240 N, especially at most 230 N, more especially at most 220 N.

Further, the strength to the stress can be enhanced by limiting the tensile strength of the spongy material. It is particularly preferable that the tensile strength of the spongy material is 80 kPa or more. The upper limit thereof is not particularly limited, but from the viewpoint of cost, productivity and availability in the market, it is preferable that the tensile strength is at most 160 kPa, especially at most 150 kPa.

The weight of the noise damper 4 can be further reduced by limiting the specific gravity of the spongy material. Thus, an external force to the noise damper 4 produced by the acceleration can be reduced, whereby it is possible to contemplate reduction of a stress acting on the adhesion face.

Generation of cracks "g" is controlled to enhance the durability of the noise damper 4 by a synergistic effect of these limited hardness, tensile strength and specific gravity of the spongy material. Therefore, the assembly 1 of the present invention can reduce a road noise over a long term.

If the spongy material has a hardness of more than 250 N, a tensile strength of less than 70 kPa or a specific gravity of more than 0.052, the effect of controlling the cracking damages is hard to be effectively exhibited. On the other hand, if the spongy material has a hardness of less than 10 N or a specific gravity of less than 0.014, the antivibration property and sound-absorbing property of the spongy material are lowered to lower the road noise reduction effect.

In order to prevent generation of cracks "g", it is preferable that the spongy material has an elongation at break of 200% or more and a tear strength of 5 N/cm$^2$ or more. The upper limits thereof are not particularly limited, but from the viewpoints of cost, productivity and availability in the market, they may be, for instance, 600% or less and 10 N/cm$^2$ or less, respectively. The elongation at break of the spongy material denotes a value measured for No. 1 dumbbell specimens according to a measuring method of paragraph 10 "tensile strength and elongation" prescribed in JIS K6400 "Testing Methods for Flexible Urethane Foam". The tear strength of the spongy material denotes a value measured for No. 1 specimens according to a measuring method of paragraph 11 "tear strength" prescribed in JIS K6400.

The noise damper 4 is suitably fixed to the inner surface 2i or 3i, for example, by an adhesive or a pressure sensitive adhesive double-coated tape. In this embodiment, a pressure sensitive adhesive double-coated tape 15 is used.

As the adhesive are preferred synthetic rubber-based liquid-type adhesives, e.g., a solution type adhesive in which a synthetic rubber is dissolved in an organic solvent, and a latex type adhesive in which a synthetic rubber is dispersed in water.

Examples of the double-coated tape 15 are one prepared by forming pressure sensitive adhesive layers on both surfaces of a sheet-like base material such as a woven fabric, a tape comprising only an adhesive layer prepared without using the base material, and other various tapes. Such double-coated tapes 15 are easy to handle and are superior in adhesion work efficiency, since they are used for example in a manner such that one adhesive layer of the tape 15 is stuck to the adhesion face 4A of the noise damper 4 while covering the other adhesive layer with a releasing paper, and when needed, the releasing paper is peeled off and the noise damper is easily adhered to the inner surface 2i or 3i. Therefore, the double-coated adhesive tape 15 is more preferably used than an adhesive.

The inside temperature of the tire 3 may elevate up to about 120° C. at the time of high speed running. Therefore, the double-coated adhesive tape 15 is required to exhibit a high adhesive strength at both ordinary temperature and high temperature. For example, it is preferable that the double-coated tape 15 has a peel strength of at least 0.147 N/mm (0.015 kgf/mm) at 25° C. (ordinary temperature) and a peel strength of at least 0.0588 N/mm (0.006 kgf/mm) at 125° C. (high temperature).

The peel strength is measured by the following method. First, as shown in FIG. 10, a sponge sheet 17 having the same composition as that of the noise damper 4 is fixed through a pressure sensitive adhesive double-coated tape 15 to a member 16 to which the noise damper 4 is to be stuck (e.g., a rubber sheet having the same composition as that of inner surface 3i of the tire). The sponge sheet 17 has a rectangular cross section with a size of 20 mm in width, 120 mm in length and 10 mm in height, and it is provided with a non-adhesion portion 17a of 20 mm in length at one longitudinal end thereof. The non-adhesion portions 17a are pulled in opposite directions using a tensile testing machine, and a tensile force (N) is measured when peeling occurs. The peel strength is obtained as a value obtained by dividing the tensile force (N) by the width 20 mm of the sponge sheet 17.

In general, the outer surface of a bladder (not shown) used in vulcanization forming of tire 3 is provided at intervals with discharging grooves for discharging air between the bladder and the tire inner surface 3i to the outside. Therefore, as shown in FIG. 11, traces of the discharging grooves of the bladder remain in the inner surface 3i of the tire to form projecting lines or stripes 19 having a small height and extending between the bead portions 3b, 3b. If the noise damper 4 is fixed to the inner surface 3i of the tire in that state, the adhesive strength between the noise damper 4 and the inner surface 3i of the tire is lowered by the projecting lines 19.

Therefore, in order to enhance the adhesive strength between the noise damper 4 and the inner surface 3i of the tire, it is preferable that the inner surface 3i of the tire to which the noise damper 4 is fixed, is provided with an adhesion region Y having a smooth surface. Such an adhesion region Y increases the adhesion area to the noise damper 4 to enhance the adhesive strength. The adhesion region Y is formed by removing the projecting lines 19 by grinding or cutting, or by conducting vulcanization of the tire 3 using a bladder having no discharging grooves in at least a portion corresponding to the adhesion region Y.

Although a particularly preferable embodiment of the present invention has been described, the present invention is not limited to only such an embodiment as illustrated in the drawings, and various changes and modifications may be made. For example, two or more noise dampers may be provided. In this case, noise dampers may be s aligned in the circumferential direction of the tire or in the axial direction of the tire. In this case, the volume V2 of the noise damper denotes the total volume of all noise dampers. Further, the present invention encompasses an embodiment directed to a pneumatic tire device comprising a pneumatic tire 3 and a noise damper 4 attached to the pneumatic tire. This device can easily provide an assembly 1 by merely mounting the device on a rim 2. As to the volume of the noise damper 4, a suitable value is previously determined according to the shape of a normal rim, and the like.

EXAMPLES

Tire assemblies having a basic structure shown in FIG. 1 were manufactured based on the specifications shown in Table 2. With respect to each assembly, the durability and road noise performance of the noise damper were tested. Other specifications common to all assemblies are as follows:
Tire size: 195/65R15
Rim size: 15×6JJ
Whole volume V1 of tire cavity: 35,900 cm$^3$
Noise damper
   Sectional shape: symmetry as shown in FIG. 12 (provided that the basic size is shown in the table)
   Circumferential length L: 1,850 mm
   Angle of tapered portion: as shown in Table 2
Method for Fixing Noise Damper
   A bar-like noise damper was curved along a tread region of the inner surface of the tire and adhered thereto using a pressure sensitive adhesive double-coated tape ("5000NS" made by Nitto Denko Corporation).
Adhesion Region in the Inner Surface of Tire: Finished to Smooth Surface
Manufacturers of spongy materials for noise damper shown in Table 2 are as follows:
*1 Achilles Corporation
*2 Inoac Corporation
*3 Kurabo Industries Ltd.
*4 Marusuzu Co., Ltd.
The testing methods are as follows:
<Durability>
   Each assembly was run on a drum (diameter: 1.7 m) under the following conditions. When the assembly run 6,000 km and 12,000 km, presence or absence of cracking in the circumferential both end portions of the noise damper was checked. The mark "O" denotes absence of cracking, and the mark "x" denotes presence of cracking.
Internal pressure: 200 kPa
Load: 6.5 kN (1.2 times the maximum value prescribed in JATMA)
Running speed: 80 km/hour
<Road Noise Performance>
Assemblies were mounted to all wheels of a Japanese 2,000 cc FF vehicle, the vehicle was allowed to run at 60 km/h on a road noise measuring road, and a noise in the vehicle was measured at an ear position on a driver's seat on the window side. A sound pressure level of a peak value of a columnar resonance around in the vicinity of 240 Hz was measured. The result is indicated as a variation value based on that of Comparative Example 1. Here, 0 (zero) means that the road noise is equal to the basis, and + (plus) means that the road noise is increased.

<Workability of Adhering Noise Damper>

A noise damper was adhered to the inner surface of a tire by using a pressure sensitive adhesive double-coated tape, and the degree of difficulty of the work was evaluated by worker's sensation according to the following criteria.

TABLE 2

| | Com. Ex. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Volume ratio V2/V1 (%) Noise damper | 0 | 6.4 | 6.4 | 6.4 | 6.4 | 6.4 | 6.4 | 6.4 | 6.4 | 6.4 |
| Manufacturer of spongy material | — | *1 | *2 | *2 | *3 | *4 | *2 | *2 | *2 | *4 |
| Product No. of spongy material | — | EY | EFS | ER-14 | 300S | E16 | EL-69 | EPH-30 | ESH | NE28 |
| Height H (mm) | — | 20 | 20 | 20 | 20 | 20 | 20 | 20 | 20 | 20 |
| Width SW (mm) | — | 100 | 100 | 100 | 100 | 100 | 100 | 100 | 100 | 100 |
| Hardness (N) | — | 50 | 20 | 50 | 60 | 80 | 90 | 250 | 140 | 110 |
| Tensile strength (kPa) | — | 80 | 110 | 90 | 100 | 80 | 150 | 160 | 120 | 110 |
| Specific gravity | — | 0.017 | 0.021 | 0.025 | 0.019 | 0.016 | 0.035 | 0.03 | 0.044 | 0.025 |
| Elongation at break (%) | — | 280 | 430 | 320 | 370 | 200 | 490 | 140 | 220 | 210 |
| Tear strength (N/cm2) | — | 5.6 | 7.1 | 5.2 | 6.3 | 5.3 | 8.9 | 9.3 | 7.7 | 6.1 |
| Angle of both ends (tapered portions) (degree) | — | 45 | 45 | 45 | 45 | 45 | 45 | 45 | 45 | 45 |
| Test results | | | | | | | | | | |
| Road noise performance (dB) | — | −5.5 | −5.0 | −5.6 | −4.8 | −5.0 | −6.7 | −6.3 | −7.8 | −6.1 |
| Durability at 6,000 km running | — | ○ | ○ | ○ | ○ | ○ | ○ | ○ | ○ | ○ |
| Durability at 12,000 km running | — | ○ | ○ | ○ | ○ | ○ | ○ | X | ○ | ○ |
| Adhesion workability | — | ○ | ○ | ○ | ○ | ○ | ○ | ○ | ○ | ○ |

| | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Volume ratio V2/V1 (%) Noise damper | 6.4 | 6.4 | 6.4 | 6.4 | 6.4 | 6.4 | 6.4 | 6.4 | 6.4 |
| Manufacturer of spongy material | *3 | *3 | *3 | *1 | *2 | *4 | *4 | *4 | *4 |
| Product No. of spongy material | 301K | 333H | 440C | PD | EMM | E16 | E16 | E16 | E16 |
| Height H (mm) | 20 | 20 | 20 | 20 | 20 | 20 | 20 | 20 | 20 |
| Width SW (mm) | 100 | 100 | 100 | 100 | 100 | 100 | 100 | 100 | 100 |
| Hardness (N) | 120 | 170 | 80 | 130 | 220 | 80 | 80 | 80 | 80 |
| Tensile strength (kPa) | 110 | 160 | 130 | 140 | 120 | 80 | 80 | 80 | 80 |
| Specific gravity | 0.019 | 0.023 | 0.034 | 0.025 | 0.052 | 0.016 | 0.016 | 0.016 | 0.016 |
| Elongation at break (%) | 270 | 240 | 240 | 210 | 200 | 200 | 200 | 200 | 200 |
| Tear strength (N/cm2) | 7.4 | 9.0 | 6.7 | 7.8 | 5.4 | 5.3 | 5.3 | 5.3 | 5.3 |
| Angle of both ends (tapered portions) (degree) | 45 | 45 | 45 | 45 | 45 | 15 | 35 | 60 | 70 |
| Test results | | | | | | | | | |
| Road noise performance | −5.8 | −5.4 | −6.4 | −5.4 | −8.5 | −4.5 | −4.8 | −5.1 | −5.2 |
| Durability at 6,000 km running | ○ | ○ | ○ | ○ | ○ | ○ | ○ | ○ | ○ |
| Durabiity at 12,000 km running | ○ | ○ | ○ | ○ | ○ | ○ | ○ | ○ | ○ |
| Adhesion workability | ○ | ○ | ○ | ○ | ○ | ○ | ○ | ○ | ○ |

| | Ex. 19 | Ex. 20 | Ex. 21 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|---|
| Volume ratio V2/V1 (%) Noise damper | 5.5 | 7.4 | 8.4 | 9.0 | 10.3 | 6.4 | 6.4 | 6.4 | 6.4 | 6.4 |
| Manufacturer of spongy material | *4 | *4 | *4 | *2 | *2 | *1 | *1 | *1 | *1 | *1 |
| Product No. of spongy material | E16 | E16 | E16 | ESH | ESH | YX | KC | US | XH | RGD |
| Height H (mm) | 20 | 20 | 20 | 30 | 35 | 20 | 20 | 20 | 20 | 20 |
| Width SW (mm) | 85 | 115 | 130 | 100 | 100 | 100 | 100 | 100 | 100 | 100 |
| Hardness (N) | 80 | 80 | 80 | 140 | 140 | 8 | 255 | 80 | 80 | 60 |
| Tensile strength (kPa) | 80 | 80 | 80 | 120 | 120 | 70 | 150 | 65 | 70 | 70 |
| Specific gravity | 0.016 | 0.016 | 0.016 | 0.044 | 0.044 | 0.015 | 0.030 | 0.019 | 0.013 | 0.054 |
| Elongation at break (%) | 200 | 200 | 200 | 220 | 220 | 300 | 170 | 200 | 150 | 160 |
| Tear strength (N/cm2) | 5.3 | 5.3 | 5.3 | 7.7 | 7.7 | 5.0 | 9.1 | 5.9 | 6.0 | 5.6 |
| Angle of both ends (tapered portions) (degree) | 45 | 45 | 45 | 90 | 45 | 45 | 45 | 45 | 45 | 45 |

TABLE 2-continued

| Test results | | | | | | | | | | |
|---|---|---|---|---|---|---|---|---|---|---|
| Road noise performance | −4.2 | −5.2 | −5.5 | −8.7 | −8.9 | −2.7 | −3.5 | −5.8 | −2.9 | −6.6 |
| Durability at 6,000 km running | ○ | ○ | ○ | ○ | X | ○ | X | ○ | X | X |
| Durability at 12,000 km running | ○ | ○ | ○ | X | — | X | — | X | — | — |
| Adhesion workability | ○ | ○ | X | ○ | ○ | ○ | ○ | ○ | ○ | ○ |

○: Good
Δ: Ordinary
X: Difficult

From the test results, it was confirmed that the assemblies of the Examples could suppress occurrence of sideways falling and permanent deformation of a noise damper and occurrence of cracking at the circumferential both ends of the noise damper, thus the durability of the noise damper was improved.

EXPLANATION OF REFERENCE SIGNS

Figure 1:
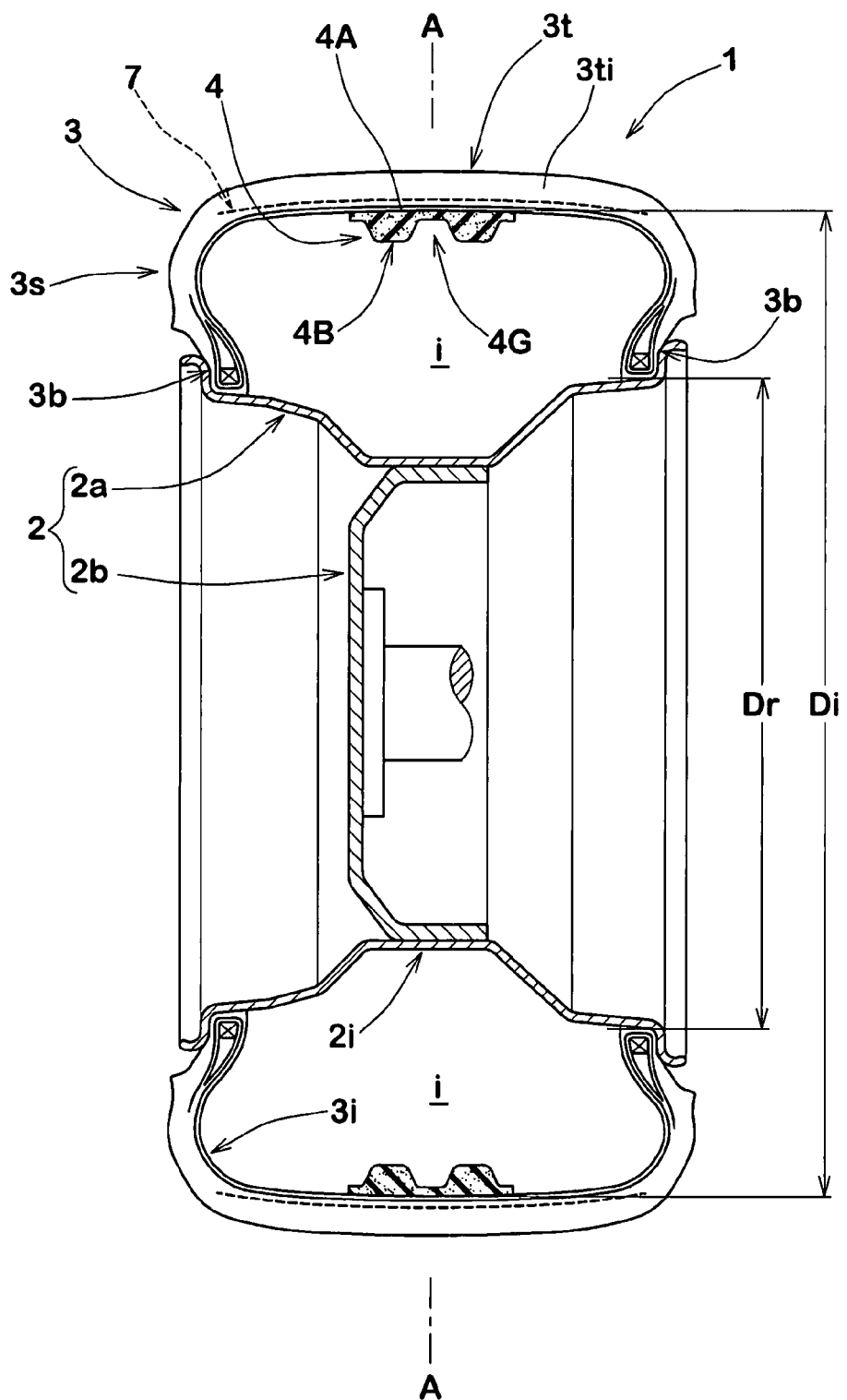
FIG. 1 is a cross sectional view of a pneumatic tire-rim assembly illustrating an embodiment of the present invention.
Figure 2:
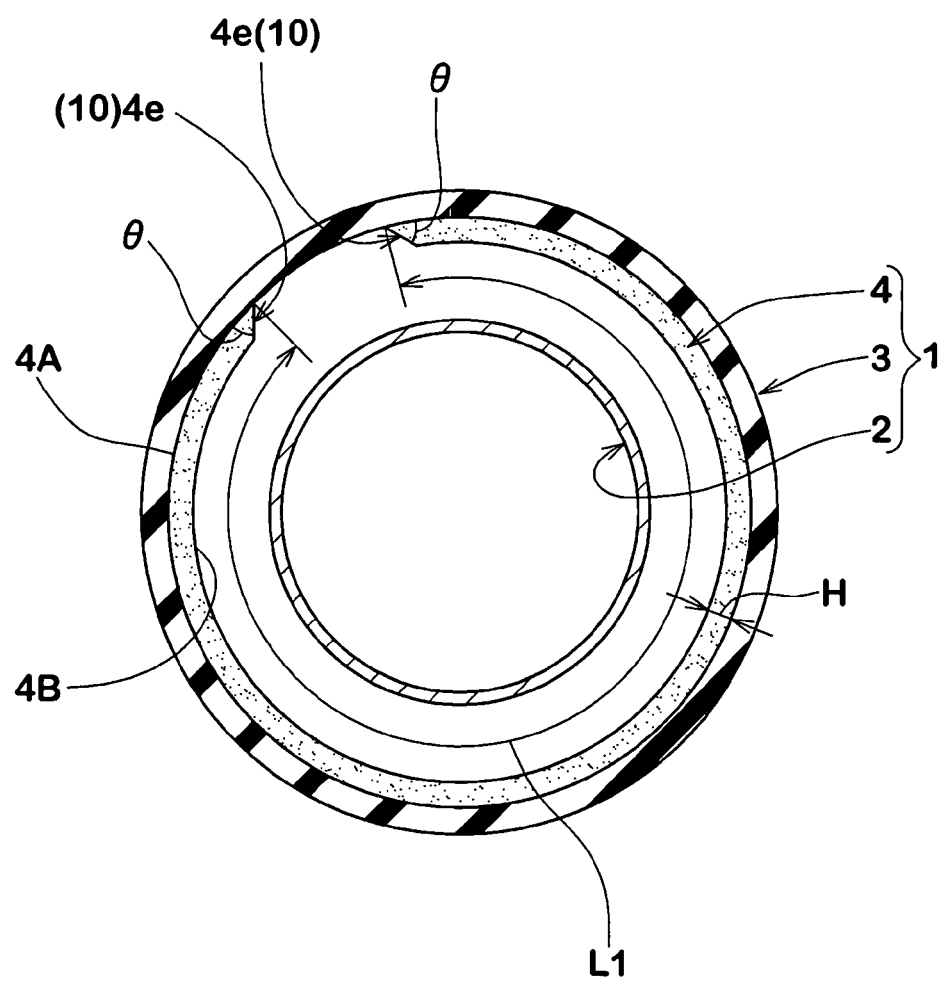
FIG. 2 is a cross sectional view taken along the line A-A of FIG. 1.
Figure 3:
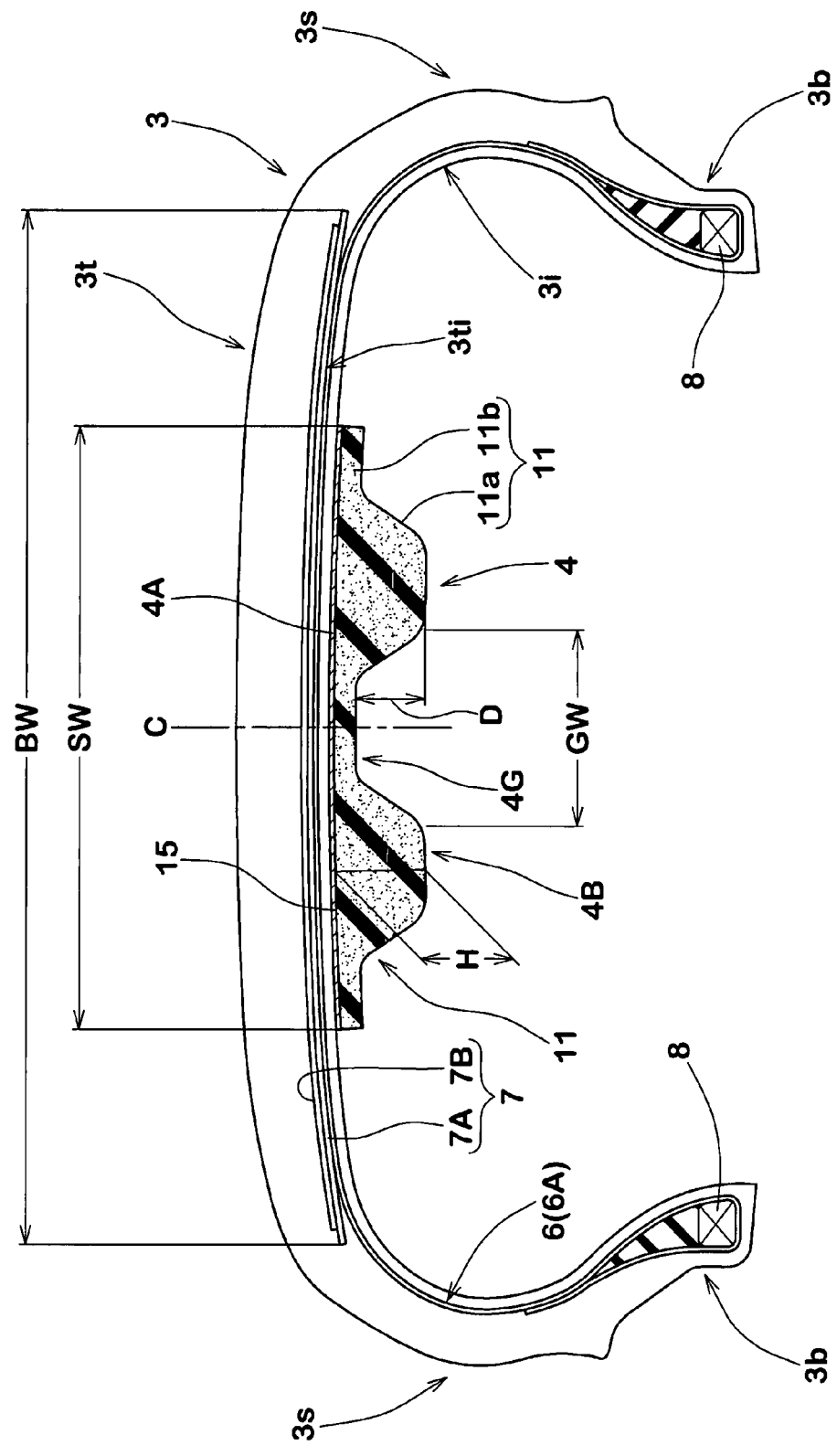
FIG. 3 is a cross sectional view of a pneumatic tire.
Figure 4:
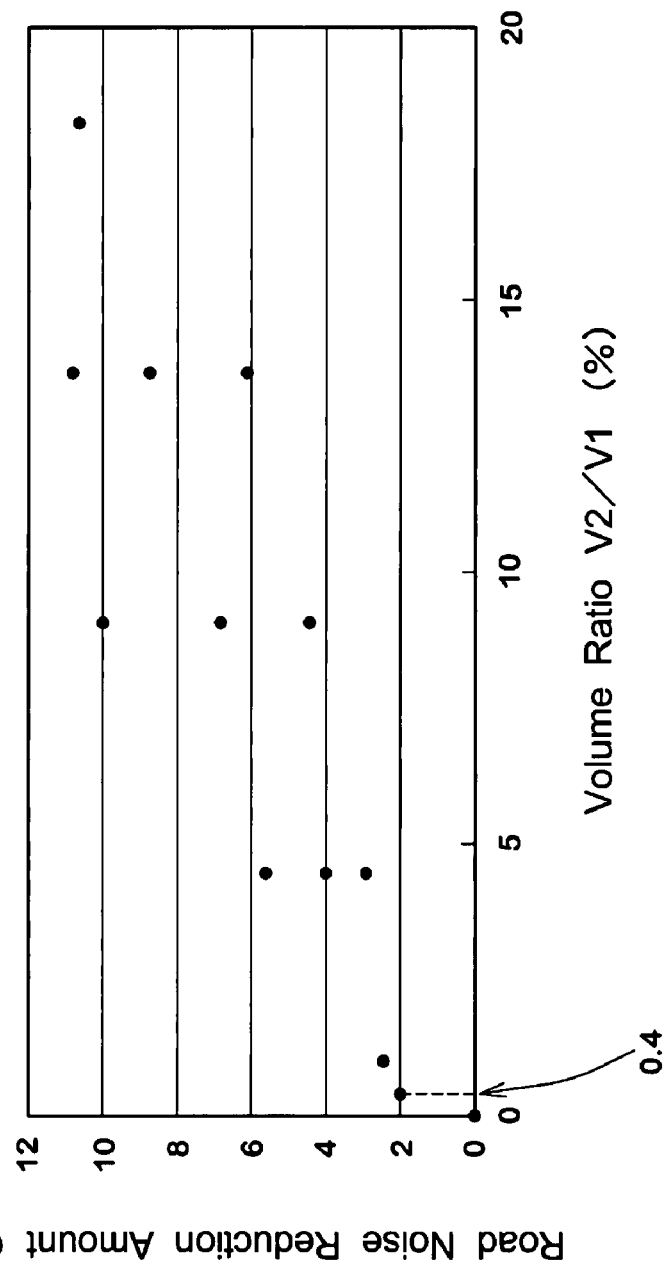
FIG. 4 is a graph showing a relationship between the volume ratio V2/V1 and the road noise reduction amount.
Figure 5:
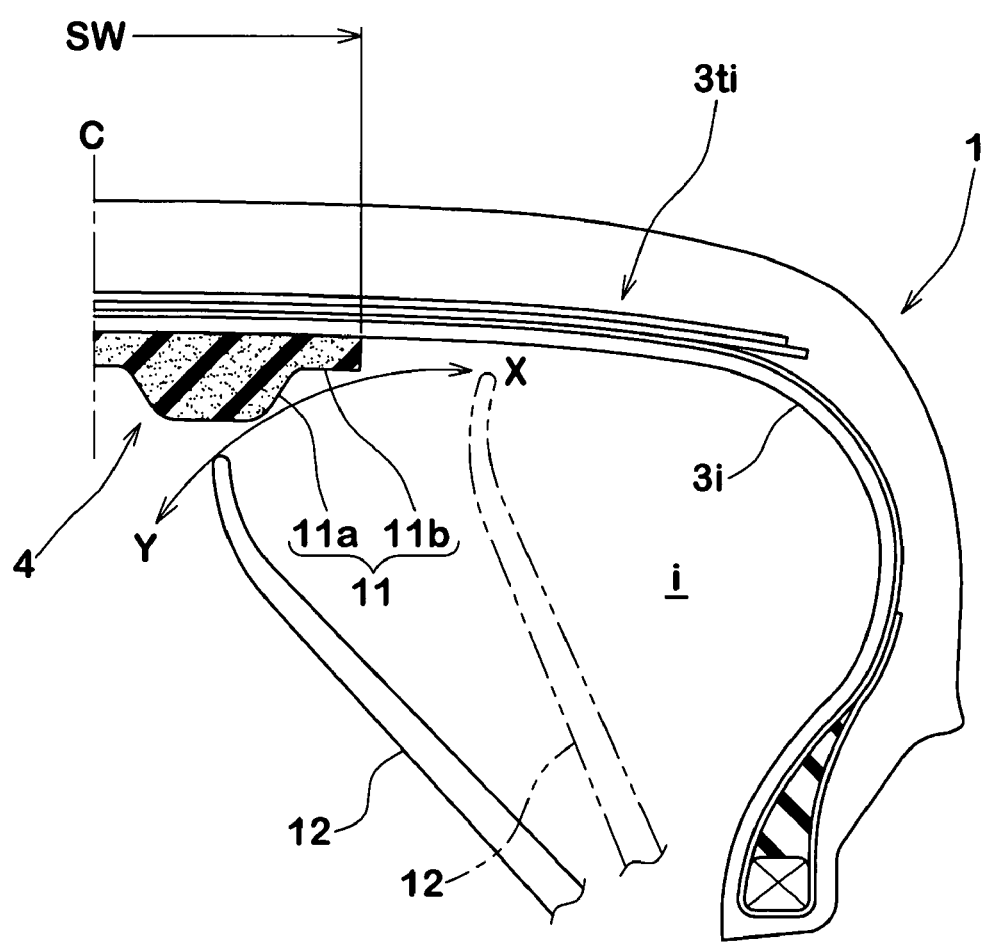
FIG. 5 is a partial cross sectional view showing a positional relation between a tire lever and a pneumatic tire at the time of mounting the tire on a rim.
Figure 6:
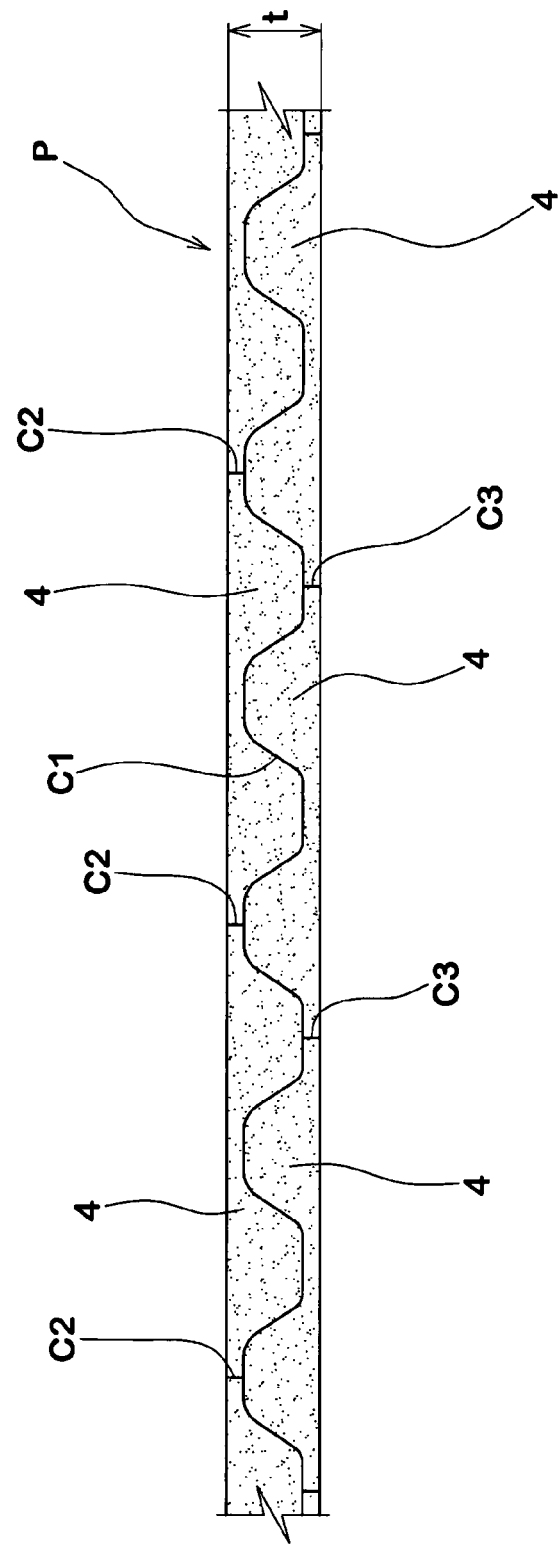
FIG. 6 is a side view illustrating an example of cutting out a noise damper from a spongy material.
Figure 7:
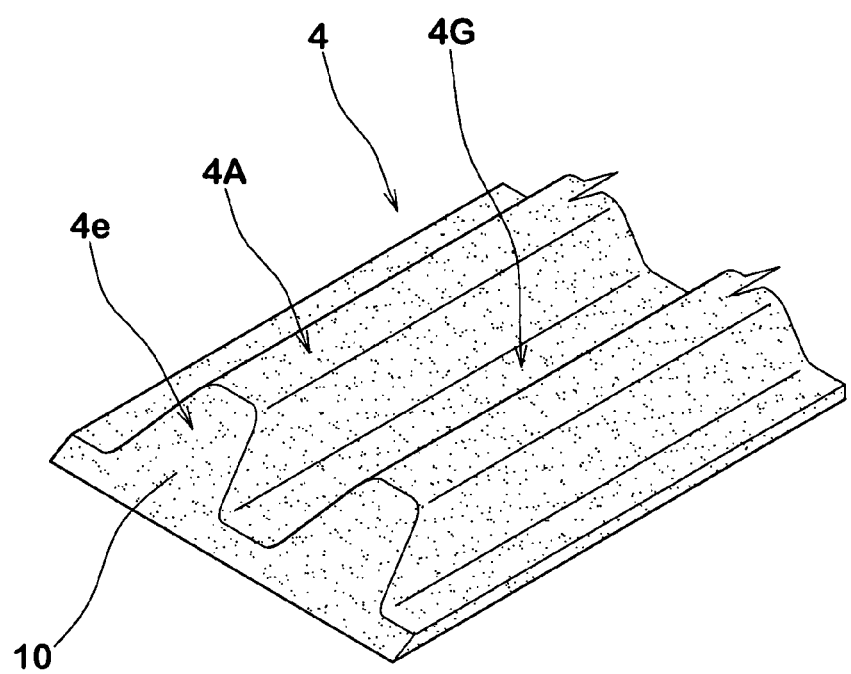
FIG. 7 is a partial perspective view showing one end portion of a noise damper.
Figure 8A:
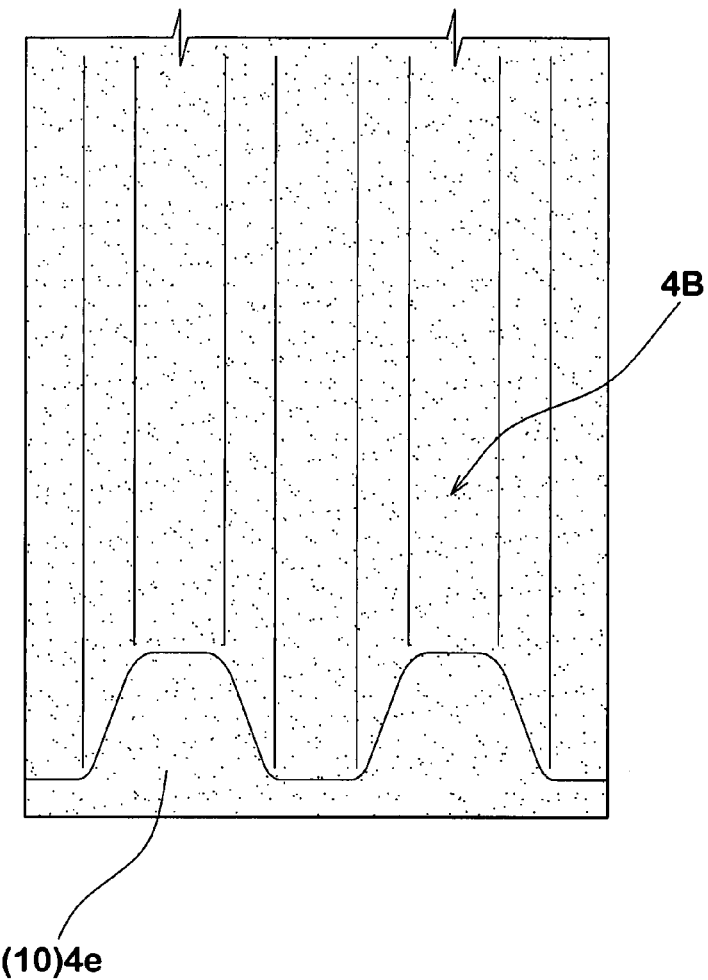
FIG. 8(A) is a plan view of a noise damper.
Figure 8B:
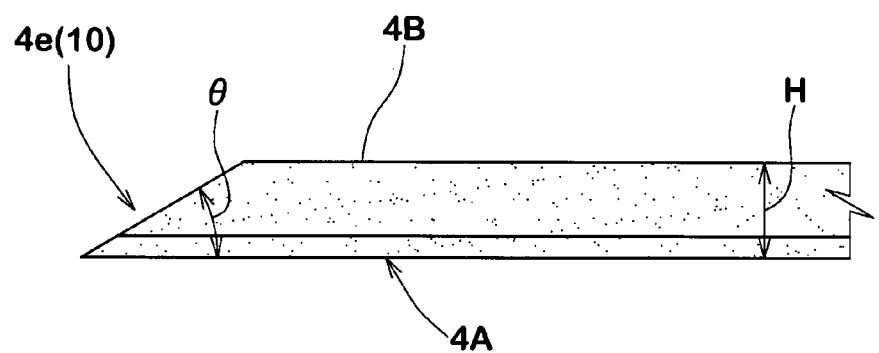
FIG. 8(B) is a side view thereof.
Figure 9A:
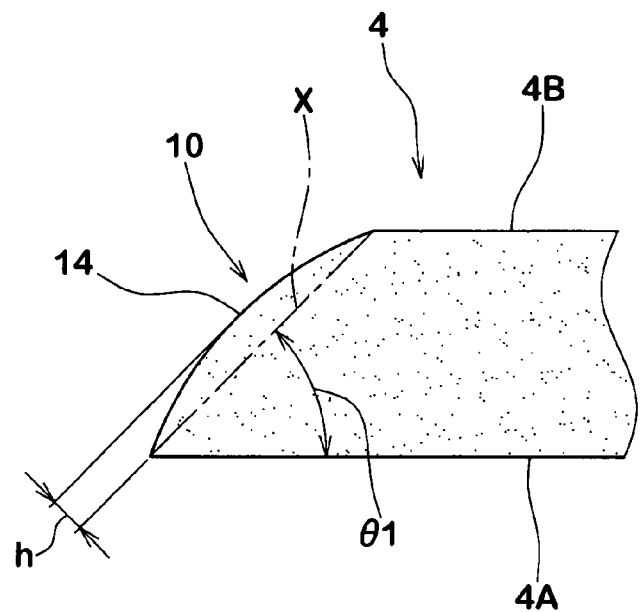
FIGS. 9(A) and 9(B) are side views showing another examples of the tapered portion.
Figure 9B:
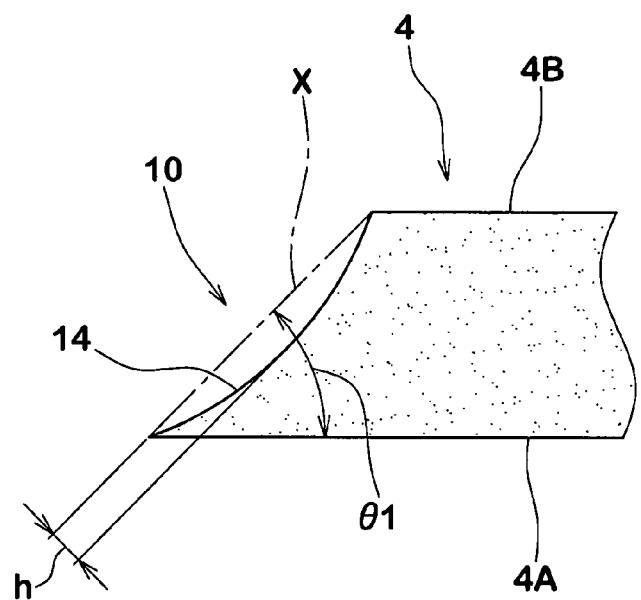
Figure 10:
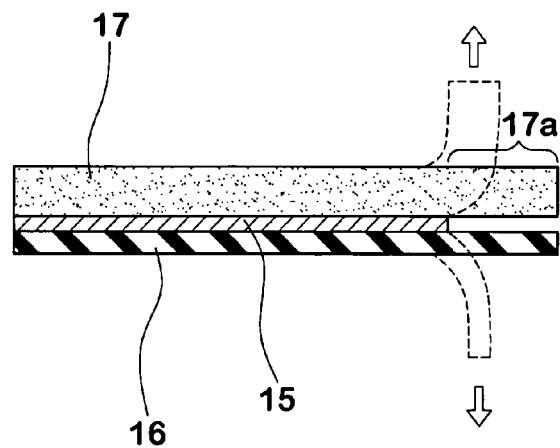
FIG. 10 is a diagram illustrating a peeling test of a pressure sensitive adhesive double-coated tape.
Figure 11:
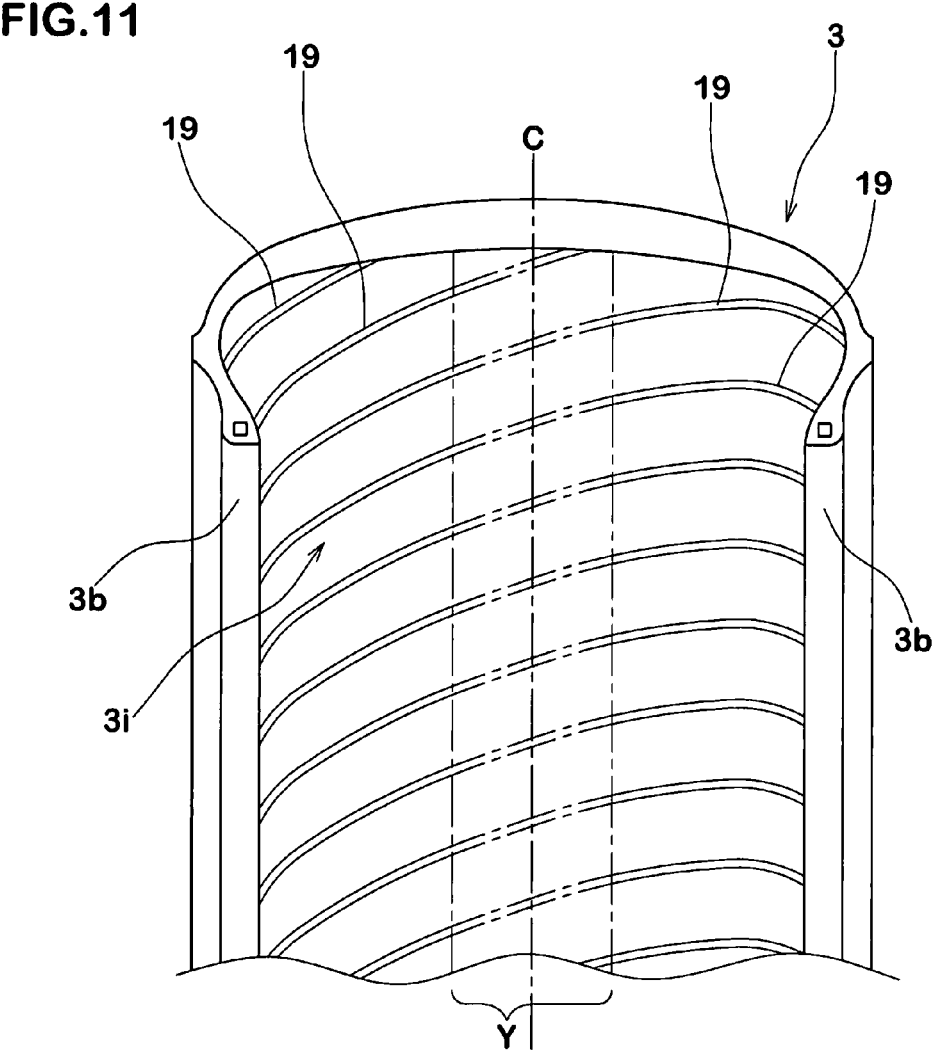
FIG. 11 is a perspective view illustrating an adhesion region in the inner surface of the tire.
Figure 12:
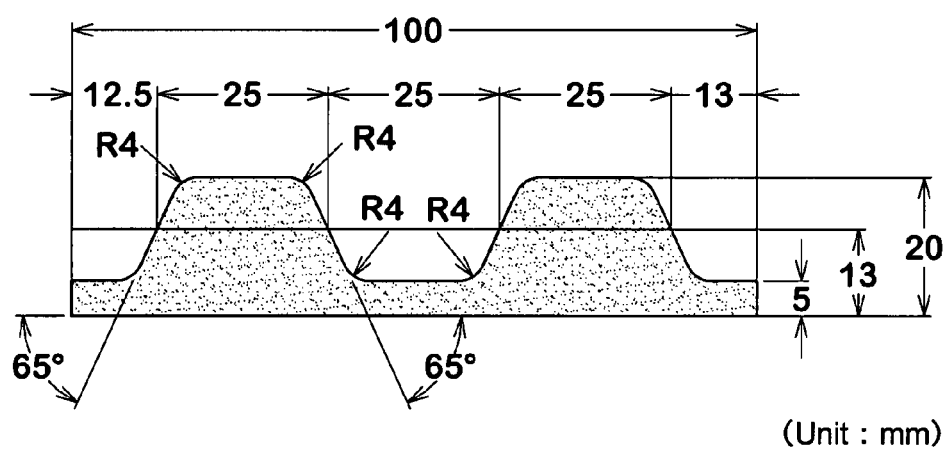
FIG. 12 is a cross sectional view of a noise damper used in the Examples.
Figure 13A:
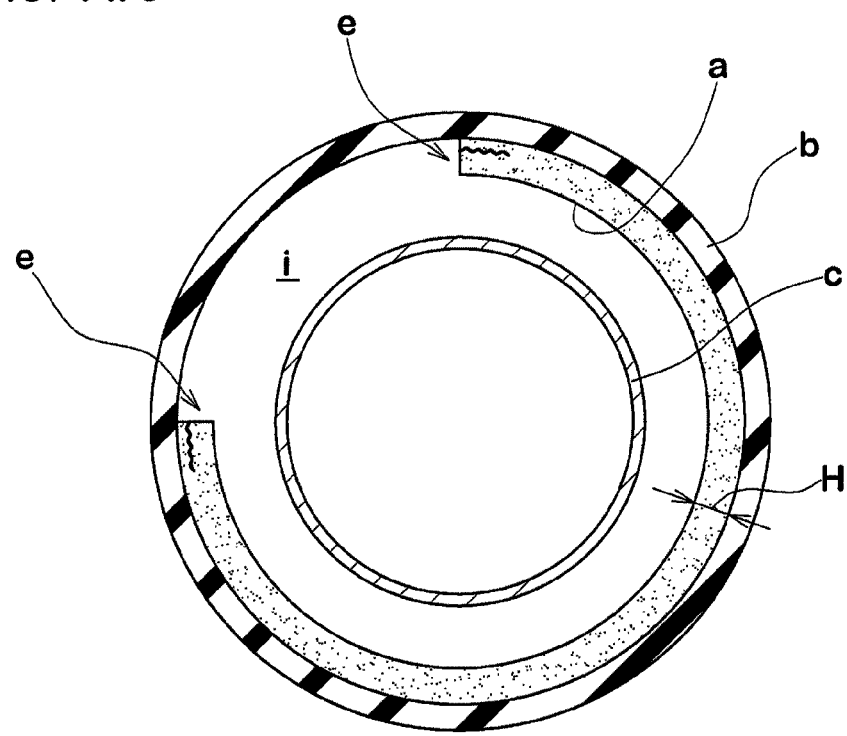
FIGS. 13(A) and 13(B) are diagrams illustrating prior art and a problem thereof.
Figure 13B:
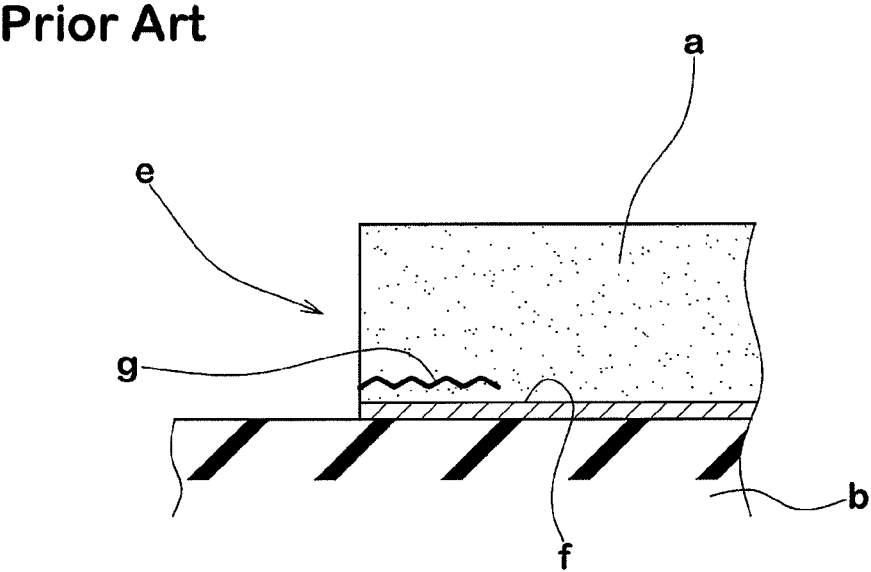

1: Assembly
2: Rim
2i: Inner surface of the rim
3: Pneumatic tire
3i: Inner surface of the tire
4: Noise damper
4A: Adhesion face
i: Tire cavity

What is claimed is:
1. A pneumatic tire
including a tread portion, a pair of sidewall portions radially inwardly extending from both edges of said tread portion, bead portions disposed at radially inner edges of said sidewall portions, and a noise damper made of a spongy material which is fixed to the inner surface of said pneumatic tire in a tread region and extends in the tire circumferential direction,
wherein said noise damper has a height of 30 mm or less from said inner surface, and said spongy material of said noise damper has a hardness of 10 to 250 N, a tensile strength of 70 kPa or more and a specific gravity of 0.014 to 0.052, and
wherein said noise damper has, at its circumferential both ends, tapered portions in which said height is gradually decreased.
2. The pneumatic tire of claim 1, wherein said noise damper is provided in its axially outer edge portions with shoulder portions the height of which smoothly decreases toward the outward in the axial direction.
3. The pneumatic tire of claim 2, wherein said shoulder portions are composed of a slant portion at which said height of the noise damper smoothly decreases outwardly in the axial direction, and a low height portion which is continuous with the edge of the slant portion and extends to the axial outer edge to terminate there with keeping an approximately constant height.
4. The pneumatic tire of claim 1, wherein in a normal state in which the pneumatic tire is mounted on a normal rim and inflated to a normal internal pressure, said noise damper has a volume V2 of 0.4 to 20% of the whole volume V1 of a tire cavity surrounded by said normal rim and said pneumatic tire.
5. The pneumatic tire of claim 4, wherein said noise damper is provided with a groove extending circumferentially at approximately a center portion in the axial direction.
6. The pneumatic tire of claim 4, wherein said noise damper is provided in its axially outer edge portions with shoulder portions the height of which smoothly decreases toward the outward in the axial direction.
7. The pneumatic tire of claim 1, wherein said noise damper is provided with a groove extending circumferentially of the tire at approximately a center portion in the axial direction.
8. The pneumatic tire of claim 7, wherein said noise damper is provided in its axially outer edge portions with shoulder portions the height of which smoothly decreases toward the outward in the axial direction.
9. A tire and rim assembly including a rim, a pneumatic tire attached to said rim and a noise damper, wherein
said noise damper is made of a spongy material which is disposed in a tire cavity surrounded by said rim and said pneumatic tire and extends in the tire circumferential direction,
said noise damper has a volume V2 of 0.4 to 20% of the whole volume V1 of said tire cavity and is fixed to a cavity-facing surface located on the tire side or rim side,
said noise damper has a height of 30 mm or less from said cavity-facing surface, and has, at its circumferential both ends, tapered portions in which said height is gradually decreased, and
said spongy material of said noise damper has a hardness of 10 to 250 N, a tensile strength of 70 kPa or more and a specific gravity of 0.014 to 0.052.

10. The assembly of claim 9, wherein said noise damper includes an adhesion face fixed to said inner surface and a free face located on the opposite side of said adhesion face and facing the tire cavity, and said tapered portions have an angle of 15to 70° between said adhesion face and said free face.

11. The assembly of claim 10, wherein said pneumatic tire includes a toroidal carcass and a belt layer disposed inside a tread portion and radially outward of said carcass, said noise damper is fixed to said cavity-facing surface located on the tire side in a tread region, and the axial width of said noise damper is 80% or less of the width of said belt layer.

12. The assembly of claim 9, wherein said pneumatic tire includes a toroidal carcass and a belt layer disposed inside a tread portion and radially outward of said carcass, said noise damper is fixed to said cavity-facing surface located on the tire side in a tread region, and the axial width of said noise damper is 80% or less of the width of said belt layer.

13. The assembly of claim 12, wherein said noise damper has an axial width which is the same as or larger than said height.

\* \* \* \* \*